US012763234B2

(12) United States Patent
Akiyama et al.

(10) Patent No.: US 12,763,234 B2
(45) Date of Patent: Oct. 13, 2026

(54) MULTILAYER VARISTOR

(71) Applicant: Panasonic Intellectual Property Management Co., Ltd., Osaka (JP)

(72) Inventors: Yuto Akiyama, Hokkaido (JP); Ken Yanai, Hokkaido (JP); Ryosuke Usui, Hokkaido (JP); Yuji Yamagishi, Hokkaido (JP); Masashi Takamura, Hokkaido (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 704 days.

(21) Appl. No.: 18/173,584

(22) Filed: Feb. 23, 2023

(65) Prior Publication Data

US 2023/0274863 A1 Aug. 31, 2023

(30) Foreign Application Priority Data

Feb. 28, 2022 (JP) ................................ 2022-030359

(51) Int. Cl.
*H01C 7/102* (2006.01)
*H01C 7/18* (2006.01)

(52) U.S. Cl.
CPC ............... *H01C 7/102* (2013.01); *H01C 7/18* (2013.01)

(58) Field of Classification Search
CPC ................................................ H01C 7/10–118
See application file for complete search history.

(56) References Cited

U.S. PATENT DOCUMENTS

| | | | | |
|---|---|---|---|---|
| 4,064,475 A * | 12/1977 | Kouchich | .............. | H01C 7/102 29/613 |
| 6,260,258 B1 * | 7/2001 | Tokunaga | .............. | H01C 17/02 338/21 |

FOREIGN PATENT DOCUMENTS

| | | | |
|---|---|---|---|
| JP | H05-047510 A | | 2/1993 |
| JP | 2000-164406 A | | 6/2000 |
| JP | 2003-017374 A | | 1/2003 |
| JP | 2004-023090 A | | 1/2004 |
| JP | 2005251993 A | * | 9/2005 |
| JP | 2010-027804 A | | 2/2010 |
| JP | 2013197509 A | * | 9/2013 |
| JP | 2017-005232 A | | 1/2017 |

OTHER PUBLICATIONS

Notice of Reasons for Refusal dated Sep. 9, 2025 issued in the corresponding Japanese Patent Application No. 2022-030359, with English translation.
Notice of Reasons for Refusal dated Oct. 7, 2025 issued in the corresponding Japanese Patent Application No. 2022-030360, with English translation.

* cited by examiner

*Primary Examiner* — Livius R. Cazan
(74) *Attorney, Agent, or Firm* — Rimon P.C.

(57) ABSTRACT

A multilayer varistor according to the present disclosure includes; a sintered compact; an internal electrode provided inside the sintered compact; a high-resistivity layer arranged to cover the sintered compact at least partially; and an external electrode arranged to cover the high-resistivity layer partially and electrically connected to the internal electrode. The high-resistivity layer includes a thinner region having a smaller thickness than a surrounding region that surrounds the thinner region.

5 Claims, 3 Drawing Sheets

MULTILAYER VARISTOR

CROSS-REFERENCE TO RELATED APPLICATIONS

The present application is based upon, and claims the benefit of priority to, Japanese Patent Application No. 2022-030359, filed on Feb. 28, 2022, the entire contents of which are hereby incorporated by reference.

TECHNICAL FIELD

The present disclosure generally relates to a multilayer varistor, and more particularly relates to a multilayer varistor including a sintered compact, internal electrodes, a high-resistivity layer, and external electrodes.

BACKGROUND ART

Multilayer varistors have been used to, for example, protect various types of electronic equipment and electronic devices from an abnormal voltage generated by lighting surge or static electricity, for example, and prevent the various types of electronic equipment and electronic devices from malfunctioning due to noise generated in a circuit.

JP 2000-164406 A discloses a chip-shaped electronic component including an underlying electrode layer, a glass coating, an external electrode layer, and an electrically conductive material. The underlying electrode layer contains a glass material and is formed in a region, where an external electrode will be formed, of a ceramic element. The glass coating is formed to overlap with at least this underlying electrode layer. The external electrode layer, also containing a glass material, is formed over the underlying electrode layer with the glass coating interposed between them. The electrically conductive material is dispersed in the glass coating interposed between the underlying electrode layer and the external electrode layer to make the underlying electrode layer and the external electrode layer electrically conductive with each other.

Some multilayer varistors have a structure including a high-resistivity layer such as a glass coating layer as in the chip-shaped electronic component described above. In a multilayer varistor having such a structure, however, its electrical characteristics (such as its electrical conductivity) may undergo deterioration before and after an electrostatic discharge (ESD).

SUMMARY

The present disclosure provides a multilayer varistor having the ability to reduce such deterioration in electrical characteristics due to the ESD.

A multilayer varistor according to an aspect of the present disclosure includes; a sintered compact; an internal electrode provided inside the sintered compact; a high-resistivity layer arranged to cover the sintered compact at least partially; and an external electrode arranged to cover the high-resistivity layer partially and electrically connected to the internal electrode. The high-resistivity layer includes a thinner region having a smaller thickness than a surrounding region that surrounds the thinner region.

BRIEF DESCRIPTION OF DRAWINGS

The figures depict one or more implementations in accordance with the present teaching, by way of example only, not by way of limitations. In the figures, like reference numerals refer to the same or similar elements.

DETAILED DESCRIPTION (1) Overview

Figure 1:
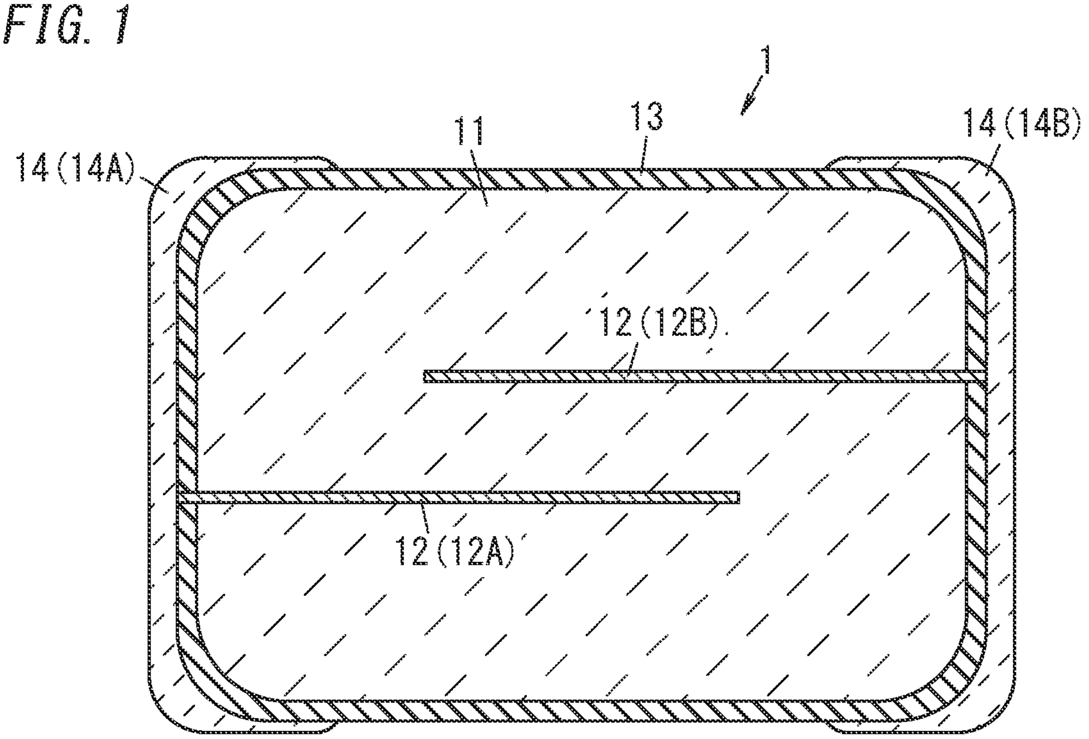
FIG. 1 is a schematic cross-sectional view of a multilayer varistor according to an exemplary embodiment of the present disclosure.

A multilayer varistor according to an exemplary embodiment of the present disclosure will now be described with reference to the accompanying drawings. FIG. 1 to be referred to in the following description of embodiments is a schematic representation. Thus, the ratio of the dimensions (including thicknesses) of respective constituent elements illustrated in FIG. 1 does not always reflect their actual dimensional ratio.

The present inventors carried out extensive research and development on respective constituent elements of a multilayer varistor to overcome the above-described problem. As a result, the present inventors discovered that in a multilayer varistor 1 including a high-resistivity layer 13 covering the sintered compact 11, there is correlation between the thickness and/or shape of the high-resistivity layer 13 and the ability to reduce the deterioration in electrical characteristics after an ESD has been caused (hereinafter referred to as "ESD resistance"), thus conceiving the concept of the present disclosure.

As shown in FIG. 1, a multilayer varistor 1 according to this embodiment includes a sintered compact 11, internal electrodes 12, a high-resistivity layer 13, and external electrodes 14. The multilayer varistor 1 is characterized in that the high-resistivity layer 13 thereof includes a thinner region (hereinafter referred to as a "thinner region X1") having a smaller thickness than a surrounding region that surrounds the thinner region.

The multilayer varistor 1, having such a configuration, enables reducing the deterioration in electrical characteristics due to ESD. In other words, the multilayer varistor 1 has excellent ESD resistance. It is not completely clear why the ESD resistance is improved by providing the thinner region X1 for the high-resistivity layer 13, but the reason is presumably as follows, for example Specifically, when a known multilayer varistor 1 generates heat due to ESD, no $O_2$ in the air is supplied to the sintered compact 11 and the $O_2$ partial pressure varies within a low range, because the sintered compact 11 is thickly covered with the high-resistivity layer 13 in the known multilayer varistor 1. This would cause a variation in its electrical characteristics such as the electrical conductivity thereof and thereby cause deterioration in the ESD resistance. In contrast, in the multilayer varistor 1 according to this embodiment, the high-resistivity layer 13 thereof has a particular shape. Specifically, the high-resistivity layer 13 has the thinner region X1 that is thinner in thickness than the surrounding region thereof. This configuration would make it easier for $O_2$ to transmit through the high-resistivity layer 13 and would allow, even when the multilayer varistor 1 generates heat due to ESD, $O_2$ to be supplied to the sintered compact 11, thus keeping the $O_2$ partial pressure constant and thereby reducing the variations in electrical characteristics such as electrical conductivity. Consequently, the ESD resistance thereof increases.

In addition, the multilayer varistor 1 according to this embodiment enables reducing the chances of causing migration by providing the thinner region X1. It is not completely clear why this advantage is achieved by adopting such a configuration in the present disclosure, but the reason is presumably as follows, for example. Specifically, when the plated electrode is formed, the plating process is performed in an acescent solution. This allows, by controlling the condition, the solution to be transmitted through the thinner region X1 to reach a surface region of the sintered compact 11, dissolve a part of the surface region of the sintered compact 11, and thereby increase the surface roughness thereof. This increases the creepage distance that a metallic ion eluted from the external electrodes 14 goes, thus reducing the chances of causing migration. Furthermore, providing the thinner region X1 enables installing the external electrodes 14 more firmly onto the high-resistivity layer 13 in the multilayer varistor 1. It is not completely clear why providing the thinner region X1 enables installing the external electrodes 14 more firmly, but the reason is presumably as follows, for example. Specifically, when baking is performed while the external electrodes 14 are being formed, some glass components such as Bi contained in the external electrodes 14 would pass through the thinner region X1 of the high-resistivity layer 13 to diffuse and reach the sintered compact 11. Then, the glass components would chemically bond to the sintered compact 11, thereby solidifying their interface. Probably for this reason, the external electrodes 14 would be installable more firmly.

Thus, the present disclosure provides a multilayer varistor having the ability to reduce such deterioration in electrical characteristics due to the ESD.

2. Details

<Multilayer Varistor>

FIG. 1 is a cross-sectional view of a multilayer varistor 1 according to an exemplary embodiment of the present disclosure. The multilayer varistor 1 includes the sintered compact 11, the internal electrodes 12, the high-resistivity layer 13, and the external electrodes 14. Optionally, the multilayer varistor 1 may further include a plated electrode which covers the external electrodes 14 at least partially.

The sintered compact 11 is made of a semiconductor ceramic component with a nonlinear resistance characteristic.

The multilayer varistor 1 may include at least one pair of external electrodes 14. In this embodiment, the pair of external electrodes 14 consists of a first external electrode 14A provided on one end face of the sintered compact 11 and a second external electrode 14B provided on the other end face of the sintered compact 11. When a voltage is applied between the first external electrode 14A and the second external electrode 14B, one of the first and second external electrodes 14A, 14B comes to have the higher potential and the other of the first and second external electrodes 14A, 14B comes to have the lower potential.

The internal electrode(s) 12 may be provided such that one internal electrode 12 or a plurality of internal electrodes 12 is/are connected to the external electrodes 14. In the multilayer varistor 1 shown in FIG. 1, the number of the internal electrodes 12 provided is two. That is to say, the internal electrodes 12 consist of a first internal electrode 12A and a second internal electrode 12B. The first internal electrode 12A is electrically connected to the first external electrode 14A while the second internal electrode 12B is electrically connected to the second external electrode 14B.

The at least two external electrodes 14 are mounted on a printed wiring board on which an electric circuit is formed. The multilayer varistor 1 may be connected to, for example, the input end of the electric circuit. Upon the application of a voltage higher than a predetermined threshold voltage to between the first external electrode 14A and the second external electrode 14B, the electrical resistance between the first external electrode 14A and the second external electrode 14B decreases steeply to cause an electric current to flow through a varistor layer. This enables protecting the electric circuit that follows the multilayer varistor 1.

[Sintered Compact]

The sintered compact 11 may have any shape without limitation but usually has at least one flat portion (hereinafter referred to as a "planar portion") on the surface thereof. The surface of the sintered compact 11 may also include a non-flat portion (i.e., a curved portion), besides the planar portion. Specifically, the sintered compact 11 may have a rectangular parallelepiped shape, for example, having a pair of principal surfaces facing each other, a pair of side surfaces facing each other, and a pair of end surfaces facing each other.

The semiconductor ceramic component having a nonlinear resistance characteristic as a constituent component for the sintered compact 11 may contain, for example, ZnO as a main component thereof and $Bi_2O_3$, $Co_2O_3$, $MnO_2$, $Sb_2O_3$, $Pr_2O_3$, $Pr_6O_{11}$, $CaCO_3$, and $Cr_2O_3$ as sub-components thereof. The varistor layer constituting the sintered compact 11 may be formed by, for example, baking a ceramic sheet containing these components to cause the main component such as ZnO to be sintered and form a solid solution with some of these sub-components and to cause the other sub-components to deposit on the grain boundary.

[Internal Electrodes]

The internal electrodes 12 are provided inside the sintered compact 11. Each of the internal electrodes 12 may be formed by, for example, stacking multiple ceramic sheets, each of which contains Ag, Pd, PdAg, or PtAg, for example, and to which an internal electrode paste is usually applied, one on top of another and baking the stack.

[High-Resistivity Layer]

The high-resistivity layer 13 has higher resistivity than the sintered compact 11. The high-resistivity layer 13 is arranged to cover the sintered compact 11 at least partially. That is to say, the high-resistivity layer 13 is provided to cover the surfaces of the sintered compact 11 at least partially. Alternatively, the high-resistivity layer 13 may also be provided to cover the surfaces of the sintered compact 11 entirely. Providing the high-resistivity layer 13 allows the multilayer varistor 1 to reduce the deposition of plating during the manufacturing process.

Figure 2:
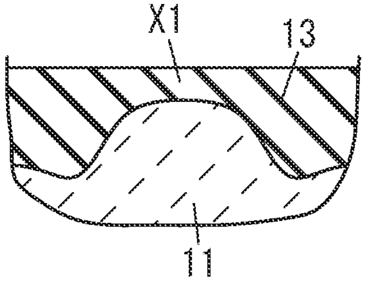
FIG. 2 illustrates a thinner region of a high-resistivity layer.

The high-resistivity layer 13 includes the "thinner region X1." As used herein, the "thinner region X1" refers to a region of the high-resistivity layer 13. The thinner region X1 of the high-resistivity layer 13 has a smaller thickness than a surrounding region thereof that surrounds the thinner region X1 as shown in FIG. 2. Specifically, the thinner region X1 herein refers to a region in which the average thickness of the high-resistivity layer 13 is equal to or less than 50% of the average thickness of the high-resistivity layer 13 in the surrounding region that surrounds the thinner region X1. As used herein, the "surrounding region that surrounds the thinner region" refers to a region which is located at a distance equal to or shorter than 50 μm from the outer periphery of the thinner region X1. The average thickness of the high-resistivity layer 13 in the thinner region X1 is preferably equal to or less than 40%, and more preferably equal to or less than 30%, of the average thickness of the high-resistivity layer 13 in the surrounding region that surrounds the thinner region X1. As used herein, the "average thickness" of the high-resistivity layer 13 refers to an arithmetic mean of the thicknesses of the high-resistivity layer 13 as measured at multiple points (e.g., at ten arbitrary points) of the high-resistivity layer 13.

The average thickness of the high-resistivity layer 13 in the thinner region X1 is preferably equal to or less than 90%, more preferably equal to or less than 80%, and even more preferably equal to or less than 70%, of the average thickness of the entire high-resistivity layer 13.

The average thickness of the high-resistivity layer 13 in thinner region X1 is preferably equal to or less than 0.01 μm. This further facilitates the supply of $O_2$ to the sintered compact 11, thus further increasing the ESD resistance of the multilayer varistor 1. The average thickness of the high-resistivity layer 13 in the thinner region X1 is more preferably equal to or less than 0.008 μm and even more preferably equal to or less than 0.006 μm. The average thickness of the high-resistivity layer 13 in the thinner region X1 may even be 0 μm but is preferably equal to or greater than 0.01 μm.

The total surface area of the thinner region X1 is preferably equal to or greater than 1% and equal to or less than 20% of the entire surface area of the high-resistivity layer 13. Setting the total surface area of the thinner region X1 at 1% or more enables further increasing the ESD resistance. Setting the total surface area of the thinner region X1 at 20% or less enables further reducing the deposition of the plating. The total surface area is more preferably equal to or greater than 2% and equal to or less than 18% and even more preferably equal to or greater than 3% and equal to or less than 15%. As used herein, the "total surface area" of the thinner region X1 refers to the sum of the respective areas of exposed portions, not covered with the external electrodes 14, for example, of the high-resistivity layer 13 in the thinner region X1. The total surface area of the thinner region X1 may be determined by analyzing a photograph shot through a scanning electron microscope (SEM) or an element mapping photograph shot by energy dispersive X-ray spectroscopy (EDX), for example. As used herein, the "entire surface area" of the high-resistivity layer 13 refers to the sum of the respective areas of exposed portions, not covered with the external electrodes 14, for example, of the high-resistivity layer 13.

Figure 3:
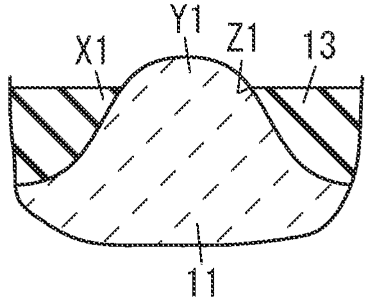
FIG. 3 illustrates an exposed portion of a sintered compact.

The thinner region X1 preferably has an opening Z1 that exposes a part of the sintered compact 11 underlying the high-resistivity layer 13. The sintered compact 11 preferably includes an exposed portion which is exposed through the opening Z1 (hereinafter referred to as an "exposed portion Y1"). As used herein, the "exposed portion" refers to a portion where the sintered compact 11 underlying the high-resistivity layer 13 is exposed in the thinner region X1 of the high-resistivity layer 13 as shown in FIG. 3. Specifically, the exposed portion Y1 refers to a part, where the crystal grains, for example, of ZnO of the sintered compact 11 underlying the high-resistivity layer 13 are exposed, of the thinner region X1 of the high-resistivity layer 13. Providing the exposed portion Y1 for the sintered compact 11 allows the sintered compact 11 to be brought into contact with $O_2$ in the air in the exposed portion Y1, thus enabling further increasing the ESD resistance.

As can be seen, the exposed portion Y1 is usually surrounded with the thinner region X1. The multilayer varistor 1, having such a structure, enables not only further increasing the ESD resistance but also further reducing the deposition of the plating as well.

The exposed portion Y1 preferably has an average longitudinal dimension equal to or greater than 1 μm and equal to or less than 50 μm. Setting the average longitudinal dimension of the exposed portion Y1 at 1 μm or more enables further increasing the ESD resistance. Setting the average longitudinal dimension of the exposed portion Y1 at 50 μm or less enables further reducing the deposition of the plating. This average longitudinal dimension is more preferably equal to or greater than 5 μm and equal to or less than 45 μm, and even more preferably equal to or greater than 10 μm and equal to or less than 40 μm. As used herein, the "longitudinal dimension" of the exposed portion Y1 refers to the longest dimension of the exposed portion in plan view. As used herein, the "average longitudinal dimension" refers to an arithmetic mean of the longitudinal dimensions as measured at multiple points (e.g., at ten arbitrary points) with respect to a plurality of exposed portions. The average longitudinal dimension of the exposed portion may be determined by analyzing a photograph shot through a scanning electron microscope (SEM) or an element mapping photograph shot by energy dispersive X-ray spectroscopy (EDX), for example.

The high-resistivity layer 13 preferably has an arithmetic mean surface roughness (Ra) equal to or greater than 0.06 μm and equal to or less than 0.9 μm. This enables not only further increasing the ESD resistance but also further reducing the deposition of the plating. The Ra value is more preferably equal to or greater than 0.08 μm and equal to or less than 0.7 μm and is even more preferably equal to or greater than 0.15 μm and equal to or less than 0.4 μm. The surface roughness Ra of the high-resistivity layer 13 may be measured by the method compliant with the JIS-B0601: 2013 standard, for example. Specifically, the surface roughness Ra of the high-resistivity layer 13 may be measured with a high-precision roughness measuring instrument Surfcorder™ ET4000A manufactured by Kosaka Laboratory Ltd. Alternatively, the surface roughness Ra may also be measured through a scanning probe microscope or with a non-contact laser microscope, for example.

The high-resistivity layer 13 may have an average thickness equal to or greater than 0.06 μm and equal to or less than 5 μm, for example. The average thickness of the high-resistivity layer 13 is preferably equal to or greater than 0.1 μm and equal to or less than 4 μm and is more preferably equal to or greater than 0.2 μm and equal to or less than 3 μm.

Examples of a method for forming the high-resistivity layer 13 include (i) applying a solution containing a precursor of the high-resistivity layer 13 onto the sintered compact 11 and (ii) allowing $SiO_2$ to react with the sintered compact 11 containing ZnO as a main component thereof.

According to the method (i), the high-resistivity layer 13 may be formed on the surface of the sintered compact 11 by, for example, applying a solution containing a precursor of the high-resistivity layer 13 onto the sintered compact 11 and then performing dehydration and curing. The precursor of the high-resistivity layer 13 may be a glass component having element Si on a main chain of polysilazane, for example. A continuous high-resistivity layer 13 containing $SiO_2$ as a main component thereof may be formed by using, as the precursor of the high-resistivity layer 13, a glass component having element Si on a main chain of polysilazane, for example. Examples of a method for applying such a solution containing a precursor include spraying, immersion, and printing.

According to the method (ii), the high-resistivity layer 13 may be formed by allowing $SiO_2$ to react with the sintered compact 11 containing ZnO as a main component thereof and thereby turning a surface region of the sintered compact

11 into a high-resistivity layer 13 including $Zn_2SiO_4$ as a main component thereof. Specifically, this method may be carried out by causing a powder or liquid containing $SiO_2$ to adhere onto the sintered compact 11 including ZnO as a main component thereof and then conducting heat treatment, for example.

The thickness, area, and other parameters of the thinner region X1 of the high-resistivity layer 13 may be controlled by appropriately selecting the concentration, temperature, amount to apply, and other parameters of the solution for use to form the high-resistivity layer 13.

[External Electrodes]

The external electrodes 14 are arranged to cover the high-resistivity layer 13 partially. Also, the external electrodes 14 are electrically connected to the internal electrodes 12.

Each of the external electrodes 14 (namely, the first external electrode 14A and the second external electrode 14B) may have a single-layer structure consisting of only a primary electrode or a multilayer structure including a primary electrode and a secondary electrode arranged to cover the primary electrode, whichever is appropriate.

The external electrodes 14 each contain a metal component such as Ag, AgPd, or AgPt and a glass component such as $Bi_2O_3$, $SiO_2$, or $B_2O_5$. The external electrodes 14 preferably contain a metal as a main component thereof, and more preferably contain silver as the main component thereof. The external electrodes 14 are usually formed by applying an external electrode paste onto respective parts of the high-resistivity layer 13.

[Plated Electrodes]

The plated electrodes are arranged to cover the external electrodes 14 at least partially. The plated electrode may each include, for example, an Ni electrode arranged to cover an associated one of the external electrodes 14 at least partially and an Sn electrode arranged to cover the Ni electrode at least partially.

(Recapitulation)

As can be seen from the foregoing description of the exemplary embodiment, a multilayer varistor (1) according to a first aspect includes; a sintered compact (11); an internal electrode (12) provided inside the sintered compact (11); a high-resistivity layer (13) arranged to cover the sintered compact (11) at least partially; and an external electrode (14) arranged to cover the high-resistivity layer (13) partially and electrically connected to the internal electrode (12). The high-resistivity layer (13) includes a thinner region (X1) having a smaller thickness than a surrounding region that surrounds the thinner region (X1).

The first aspect enables reducing deterioration in electrical characteristics due to ESD. In addition, the first aspect also enables reducing the chances of causing migration in the multilayer varistor (1). Furthermore, the first aspect also allows the external electrode (14) to be installed more firmly with respect to the high-resistivity layer (13) in the multilayer varistor (1).

In a multilayer varistor (1) according to a second aspect, which may be implemented in conjunction with the first aspect, the high-resistivity layer (13) has an average thickness equal to or less than 0.01 μm in the thinner region (X1).

The second aspect enables further increasing the ESD resistance.

In a multilayer varistor (1) according to a third aspect, which may be implemented in conjunction with the first or second aspect, an average thickness of the high-resistivity layer (13) in the thinner region (X1) is equal to or less than 50% of an average thickness of the high-resistivity layer (13) in the surrounding region.

The third aspect enables further increasing the ESD resistance.

In a multilayer varistor (1) according to a fourth aspect, which may be implemented in conjunction with any one of the first to third aspects, a total surface area of the thinner region (X1) is equal to or greater than 1% and equal to or less than 20% of an entire surface area of the high-resistivity layer (13).

The fourth aspect enables not only further increasing the ESD resistance but also further reducing the deposition of the plating.

In a multilayer varistor (1) according to a fifth aspect, which may be implemented in conjunction with any one of the first to fourth aspects, the thinner region (X1) has an opening (Z1) exposing a part of the sintered compact (11) underlying the high-resistivity layer (13), and the sintered compact (11) includes an exposed portion (Y1) exposed through the opening (Z1).

The fifth aspect enables further increasing the ESD resistance.

In a multilayer varistor (1) according to a sixth aspect, which may be implemented in conjunction with the fifth aspect, the exposed portion (Y1) is surrounded with the thinner region (X1).

The sixth aspect enables not only further increasing the ESD resistance but also further reducing the deposition of the plating.

In a multilayer varistor (1) according to a seventh aspect, which may be implemented in conjunction with the fifth or sixth aspect, the exposed portion (Y1) has an average longitudinal dimension equal to or greater than 1 μm and equal to or less than 50 μm.

The seventh aspect enables not only further increasing the ESD resistance but also further reducing the deposition of the plating.

In a multilayer varistor (1) according to an eighth aspect, which may be implemented in conjunction with any one of the first to seventh aspects, the high-resistivity layer (13) has an arithmetic mean surface roughness equal to or greater than 0.06 μm and equal to or less than 0.9 μm.

The eighth aspect enables not only further increasing the ESD resistance but also further reducing the deposition of the plating.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

The invention claimed is:

1. A multilayer varistor comprising:

a sintered compact;

an internal electrode provided inside the sintered compact;

a high-resistivity layer arranged to cover the sintered compact at least partially; and an external electrode arranged to cover the high-resistivity layer partially and electrically connected to the internal electrode, wherein:

the high-resistivity layer includes a thinner region having a smaller thickness than a surrounding region that surrounds the thinner region, and the thinner region has an opening exposing a part of the sintered compact underlying the high-resistivity layer to an air, and the sintered compact includes an exposed portion exposed through the opening to be brought into contact with $O_2$ in the air.

2. The multilayer varistor of claim 1, wherein the exposed portion is surrounded with the thinner region.

3. The multilayer varistor of claim 1, wherein the exposed portion has an average longitudinal dimension equal to or greater than 1 μm and equal to or less than 50 μm.

4. A multilayer varistor comprising:

a sintered compact;

an internal electrode provided inside the sintered compact;

a high-resistivity layer arranged to cover the sintered compact at least partially; and an external electrode arranged to cover the high-resistivity layer partially and electrically connected to the internal electrode, wherein:

the high-resistivity layer includes a thinner region having a smaller thickness than a surrounding region that surrounds the thinner region, the thinner region has an opening exposing a part of the sintered compact underlying the high-resistivity layer, and the sintered compact includes an exposed portion exposed through the opening, and the exposed portion has an average longitudinal dimension equal to or greater than 1 μm and equal to or less than 50 μm.

5. The multilayer varistor of claim 4, wherein the exposed portion is surrounded with the thinner region.

* * * * *